United States Patent [19]

Hydes et al.

[11] 4,258,361

[45] Mar. 24, 1981

[54] DISPLAY SYSTEM HAVING MODIFIED SCREEN FORMAT OR LAYOUT

[75] Inventors: Alan F. Hydes, North Baddesley; Alan L. Jones, Chandlers Ford, both of England

[73] Assignee: International Business Machines Corporation, Armonk, N.Y.

[21] Appl. No.: 24,481

[22] Filed: Mar. 27, 1979

[30] Foreign Application Priority Data

Mar. 31, 1978 [GB] United Kingdom ............... 12591/78

[51] Int. Cl.[3] ............................................... G06F 3/14

[52] U.S. Cl. .................................. 340/721; 340/734; 340/735; 340/745; 340/790

[58] Field of Search ............... 340/717, 721, 734, 751, 340/790, 735, 745, 744

[56] References Cited

U.S. PATENT DOCUMENTS

| | | | |
|---|---|---|---|
| 3,428,851 | 2/1969 | Greenblum | 315/392 |
| 3,777,059 | 12/1973 | Wilkey, Jr. | 340/717 |
| 3,792,462 | 2/1974 | Casey et al. | 340/721 |
| 3,973,245 | 8/1976 | Belser | 340/799 |
| 4,075,620 | 2/1978 | Passavant et al. | 340/751 |
| 4,112,423 | 9/1978 | Bertolasi | 340/717 |
| 4,144,405 | 3/1979 | Wakamatso | 340/751 |
| 4,146,879 | 3/1979 | Nicholson et al. | 340/734 |

FOREIGN PATENT DOCUMENTS

| | | |
|---|---|---|
| 849340 | 1/1977 | Belgium . |
| 53-74325 | 7/1978 | Japan . |

OTHER PUBLICATIONS

IBM Tech. Discl. Bull.; vol. 18, #10; 3/76; pp. 3392-3396; Cummins, et al.; *Display Refresh Mechanism Employing a Multisequented Buffer.*

*Primary Examiner*—Marshall M. Curtis

*Attorney, Agent, or Firm*—Frederick D. Poag

[57] ABSTRACT

A display system having a scanned CRT provides a full screen layout of alphanumeric characters and at least one additional screen layout, e.g. a split screen layout.

A refresh buffer stores data to be displayed in a first sequence of addresses so that when this data is read out by address generator in the first sequence a full screen layout results. A read only translation store may be selectively addressed by the first sequence of addresses to provide a modified sequence of translated addresses. When the refresh buffer is addressed by the sequence of translated addresses, a split screen layout of the data results. A selector is operable to address the refresh buffer with either the first sequence of addresses or the sequence of translated addresses.

Logic inhibits character display in a blank area between the two halves of the split screen. Attribute decode logic enables different attributes to control screen halves during split screen operation.

Read only store is preferably replaced by a read/write store when several alternative screen layouts are required. Each alternative screen layout requires a sequence of translated addresses to be supplied to the read/write store from a controller.

9 Claims, 9 Drawing Figures

DISPLAY SYSTEM HAVING MODIFIED SCREEN FORMAT OR LAYOUT

FIELD OF THE INVENTION

The present invention relates to a display system having a scanned display device.

BACKGROUND OF THE INVENTION

Most present day alphanumeric displays have a fixed screen format or layout i.e. they have a fixed number of characters per row and a fixed number of rows. An example of this type of display is the IBM 3270 Information Display System manufactured by International Business Machines Corporation.

Display systems are also known which allow what is known as a split screen layout. In this layout, characters are displayed as a left hand section and a right hand section separated by a vertical blank column. Possible methods of performing this split screen layout are either to rearrange storage locations in a refresh buffer and use fixed addressing during refresh or to allow a controller to determine screen position of displayed data by microcode, and again use fixed addressing.

Both of these methods are unsuitable for the above mentioned Information Display System as the possible 32 CRT screens controlled by a single controller would have degraded performance due to the additional microcode and software execution.

In the prior art UK Pat. No. 1,178,749 proposes a display system in which different screen layouts are obtained by having a characteristic raster pattern for each screen layout.

Displays with split screen layout are used in the Newspaper Industry as it is easier when comparing an article with an edited version of the same article to have them displayed side by side. Also displays with special screen formats are required to display the Japanese language and Hanguel characters for the Korean national language.

SUMMARY OF THE INVENTION

According to the invention, a display system comprises a scanned refresh display device, a refresh buffer having storage positions for data to be displayed and address generating means arranged to address the refresh buffer in a first sequence of addresses to display the data in a first screen layout, characterized by a translation store addressable by said first sequence of addresses to read out a modified sequence of translated addresses arranged to address the refresh buffer to display the data in a second screen layout, and selection means operable in a first mode to switch said first sequence of addresses to the refresh buffer or operable in a second mode to switch said modified sequence of translated addresses to the refresh buffer.

The invention has the advantage that as the data stored in the refresh buffer remains unchanged with changed screen layout only the sequence in which data is read out changes, little degrading of performance occurs. Also a flexible display system results as each alternative screen layout desired requires only a suitable sequence of modified addresses.

BRIEF DESCRIPTION OF THE DRAWINGS

In order that the invention may be more readily understood, reference will now be made, by way of example, to the accompanying drawings, in which.

DETAILED DESCRIPTION OF THE DRAWINGS

Figure 1:
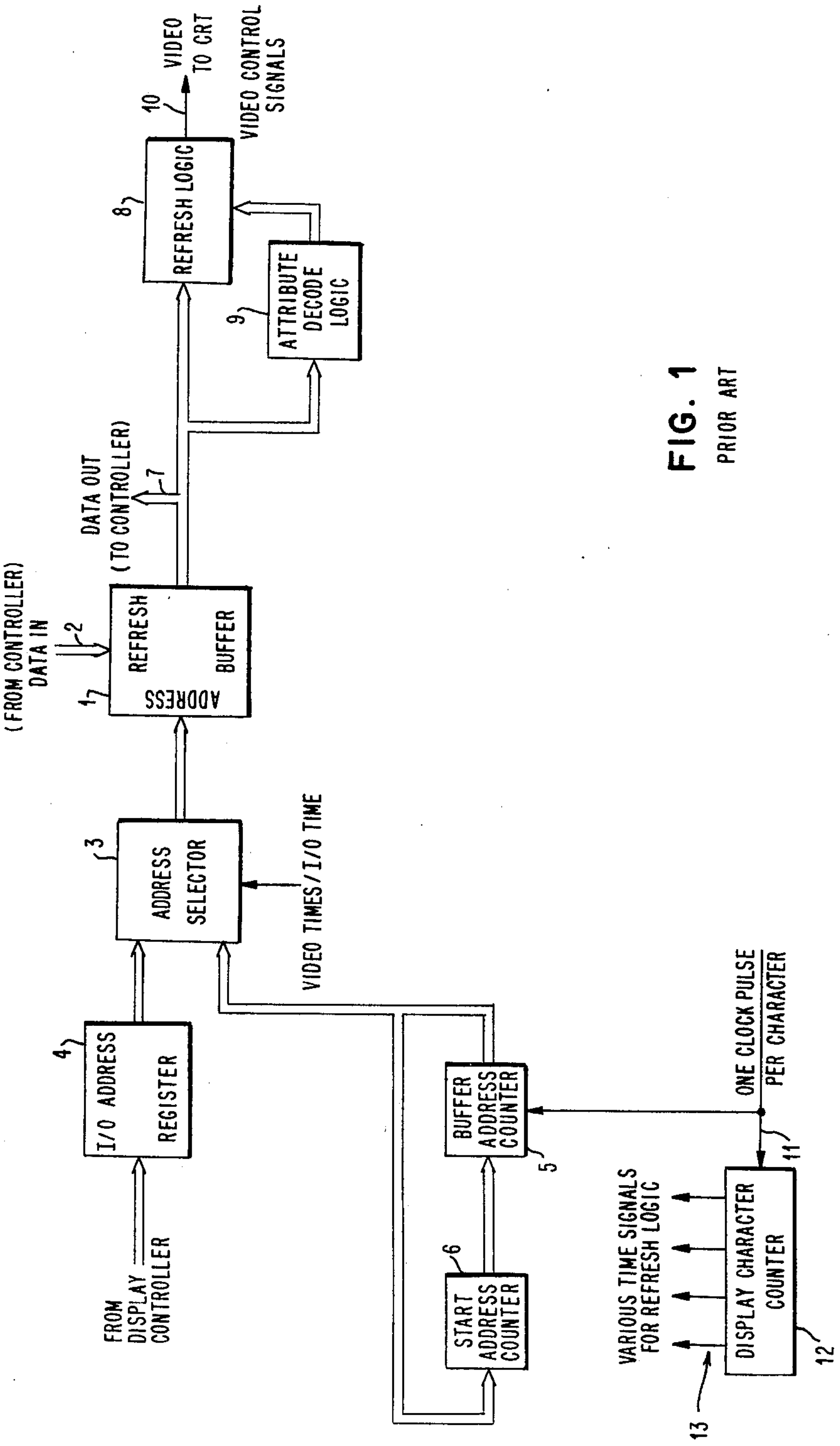
FIG. 1 PRIOR ART
FIG. 1 shows logic associated with a refresh logic in a prior art display system.

FIG. 1 shows a portion of the logic associated with the refresh buffer as used in the IBM 3278 Information Display System manufactured by International Business Machines Corporation.

Refresh buffer 1 stores data to be displayed as dot matrix characters on a CRT screen (not shown). Buffer 1 may be addressed in one of two modes. Firstly, when data is fed into buffer 1 on bus 2 from a display controller or read out to the display controller on bus 7, address selector 3 passes addresses from I/O address register 4 to address buffer 1 during I/O time to control the storage positions of data stored. Addresses in address register 4 are supplied from the display controller.

Secondly, when data is displayed in a refresh mode, the data stored in buffer 1 is addressed by addresses supplied by address selector 3 during video time from buffer address counter 5. Start address counter 6 determines the address in buffer 5 at which each line starts.

When operating in the refresh mode, data from buffer 1 is fed to refresh logic 8 and attribute decode logic 9. Refresh logic 8 takes the data in the form of character codes and generates sixteen character slices of dots for each character code for display along scan line 5 to produce video outputs on line 10 to drive a CRT screen. Attribute decode logic 9 takes attributes stored with character codes to set latches which generate video control signals to determine how associated characters are displayed.

An attribute byte is displayed as a blank, and is included to control how the following alphanumeric data should be displayed until the next attribute byte is received. For example, one attribute byte is BRIGHT UP which means that the following alphanumeric characters will be displayed brighter than normal. This brighter display may be terminated by an attribute byte NORMAL. Following this, characters will be displayed at normal intensity. Thus an attribute is a control character which is not displayed but controls how subsequent characters should be displayed.

Figure 5:
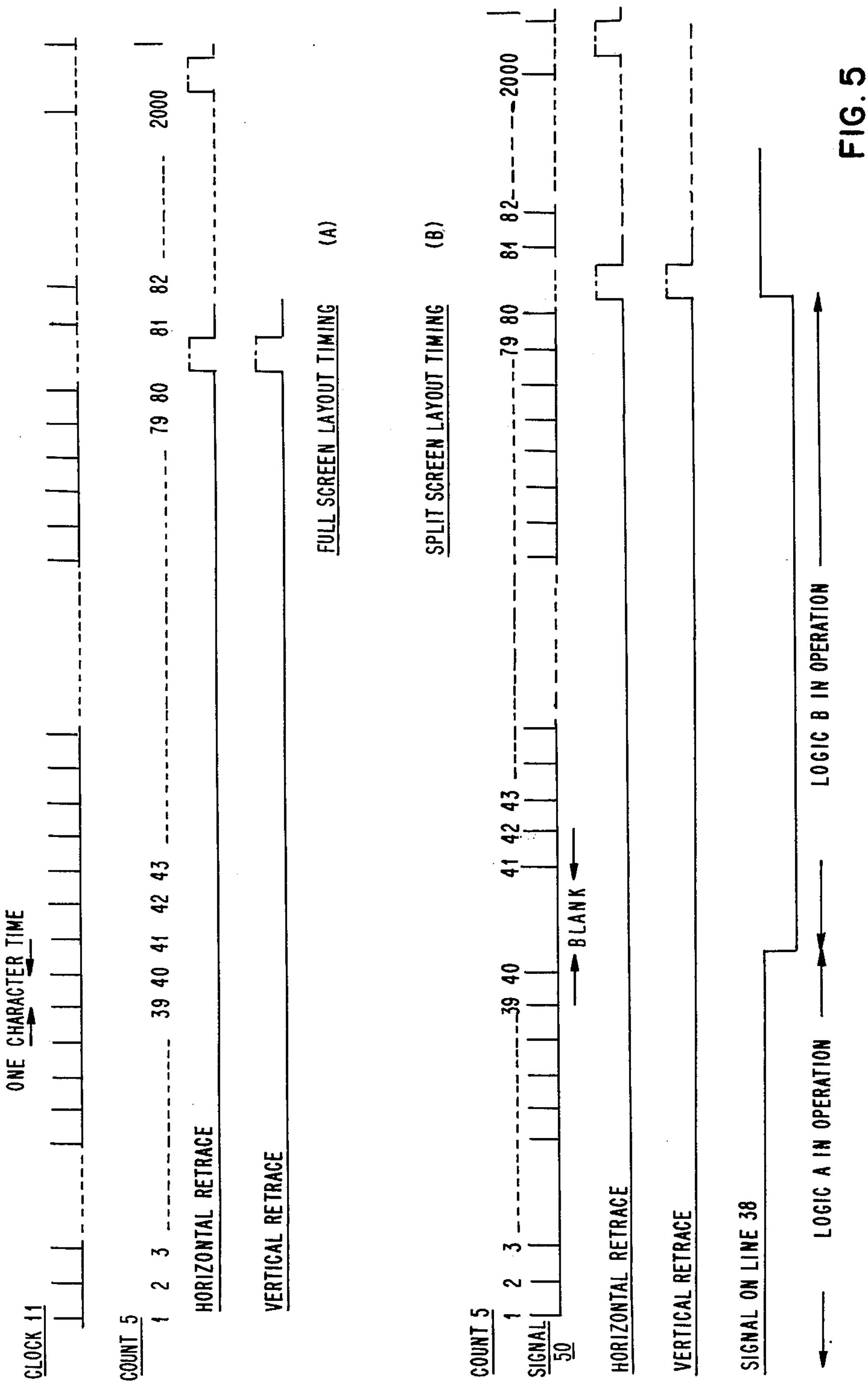
FIGS. 5A and 5B show timing diagrams for full screen and split screen layout respectively.

Synchronization between buffer addressing and a scanning generator controlling scan lines of the CRT is determined by a clock pulse on line 11 which occurs once per character. FIG. 5A illustrates timing pulses for the display system of FIG. 1. This clock pulse operates display character counter 12 which generates timing signals 13 which synchronize refresh logic, horizontal and vertical retrace, etc.

Figure 2:
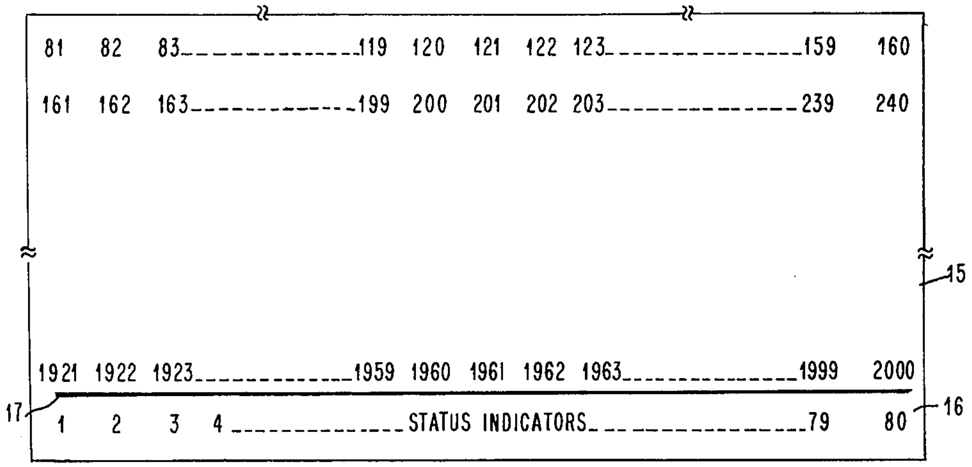
FIG. 2 shows the full screen layout produced by the logic of FIG. 1.

FIG. 2 shows the screen layout of alphanumeric character rows in an upper major portion 15 of the screen and status indicators in a single lower row of characters 16. Character positions are represented by numerals which correspond to addresses within refresh buffer 1. For example, status indicators 16 are stored in refresh buffer addresses 1 to 80. At the top of the screen the upper row of characters have refresh buffer addresses 81 to 160, and the next row down addresses 161 to 140 etc. to the last row of addresses 1921 to 2000.

It will be noted that the screen addresses are sequential from left to right, top to bottom and are in the same order as stored in refresh buffer 1. The status indicators have addresses 1 to 80, as in this prior art display, models are made having various screen sizes and so the number of character rows depends on the particular model. Thus, it is convenient that the status indicators should always have the same address.

During refresh, refresh buffer 1 is read out by sequentially addressing 1 to 2000 in sequence. Initially start address counter 6 sets buffer address counter 5 to zero. As shown in FIG. 5A, clock pulses on line 11 are counted by buffer address counter 5 from 1 to 80 sixteen times to display status indicators 16 (FIG. 2). After the last count 80 horizontal retrace and vertical retrace signals are generated by display character counter 12 so that the next character row scan starts at the top left hand corner. These retrace signals occupy several clock periods and during this time, count 80 is stored by start address counter 6 and then fed back to buffer address counter 5.

Thus the next count is 81 to 160 to display the top character row of the screen. A horizontal retrace signal is generated after each count of 80 clock pulses. A similar counting sequence follows for each row until the last line displaying data ends at count 2000 when buffer address counter 5 is reset to zero, and the next complete scan of the screen starts.

A continual horizontal line 17 is displayed between portions 15 and 16 of the screen. Line 17 is not stored in refresh buffer 1 but generated independently.

Figure 3:
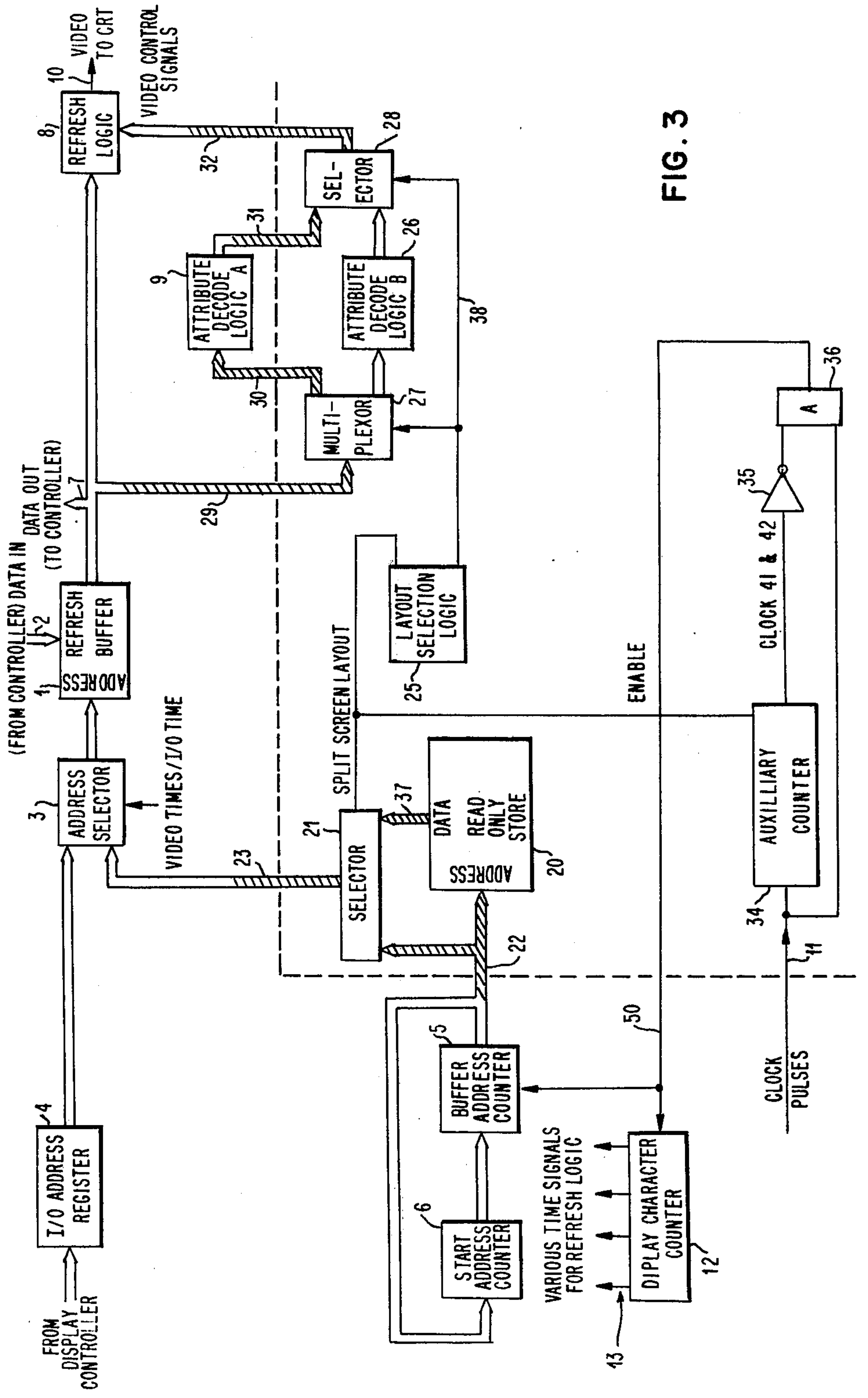
FIG. 3 includes the logic blocks of FIG. 1 and shows display system logic embodying the present invention to produce a split screen character layout.

FIG. 3 illustrates an embodiment of the present invention and includes the logic blocks of FIG. 1 using the same numerals together with additional logic to produce a split screen layout. Read only store 20 acts as a translation store for addresses. In FIG. 1, refresh buffer 1 addresses are derived directly from buffer address counter 5, whereas in FIG. 3, buffer 1 addresses are either obtained indirectly from buffer address counter 5 on bus 22 after translation by read only store (ROS) 20 via selector 21 or alternatively derived directly as in FIG. 1 via selector 21.

Layout selection logic 25 controls selector 21 to connect bus 22 to bus 23 or bus 37 to bus 23. In its simplest form layout selection logic 25 includes a simple two-way switch, or it may be a two state device set by the display controller under operator or program control. ROS 20 is personalized during manufacture and in the present embodiment translates from full screen layout as in FIG. 2 to split screen layout as in FIG. 4. This will be explained in more detail later.

With split screen layout the attribute decode logic 9 of FIG. 1 is replaced by attribute decode logic A 9 together with attribute decode logic B 26 to enable attributes to be interpreted independently for column A and column B during split screen operation.

When operating in split screen layout, as shown in FIG. 5B layout selection logic 25 generates a signal on line 38 according to whether the CRT scan is in left hand column A or right hand column B (FIG. 4) of the split screen. This signal on line 38 controls multiplexor 27 and selector 28 so that when column A is being scanned, logic A 9 is in operation and when column B is being scanned, logic B 26 is in operation. Attribute decode logic A 9 and attribute logic B 26 are identical and have exactly the same function as logic 9 in FIG. 1—attributes stored as control characters in refresh buffer 1 set latches which generate video control signals on line 32 to determine how characters are displayed.

In full screen layout or when scanning column A, bus 29 is connected to bus 30 and bus 31 connected to bus 32 thus using attribute decode logic A. When scanning column B is split screen layout, bus 29 is connected to attribute decode logic B26, the output of which is connected to bus 32.

When in full screen layout, timing signals 13 are generated as shown in FIGS. 1 and 5A. Layout selection logic 25 supplies an inhibit signal to auxiliary counter 34, enabling AND 36 and so clock pulses on line 11 reach counter 5 via line 50. During split screen operaton, layout selection logic 25 supplies and enables signal to auxiliary counter 34 and timing is as illustrated in FIG. 5B. For each scan line, auxiliary counter 34 receives clock pulses on line 11, and produces an output to inverter 35 at clock counts 41 and 42. These two clock counts inhibit AND 36 which also receives clock pulses. Thus, as shown in FIG. 5B the output signal on line 50 consists of forty clock pulses followed by a blank of two clock pulses, and finally another forty clock pulses, which are labelled as count 1–40 and 41–80. These signals on line 50 are fed to display character counter 12 and buffer address counter 5.

Thus counter 5 will count from 1 to 40 for column A and from 41 to 80 for column B. Between column A and column B is a blank area 40 two characters wide as a result of the two clock pulses inhibited by AND 36. During display of blank area 40, video to CRT on line 10 is inhibited to prevent characters appearing in this blank area. As mentioned previously, the signal on line 38 changes during this blank area.

Following count 80 horizontal retrace and vertical retrace signals are generated to start the next scan line at the top of the screen. This, as previously explained for full screen operation, is because lower row 16 of characters are reserved for status indicators.

Data in refresh buffer 1 is stored with addresses of alphanumeric characters 1 to 2000 as shown in FIG. 2. Data fed into buffer 1 during I/O time from the display controller or an input keyboard is arranged with these addresses.

Figure 4:
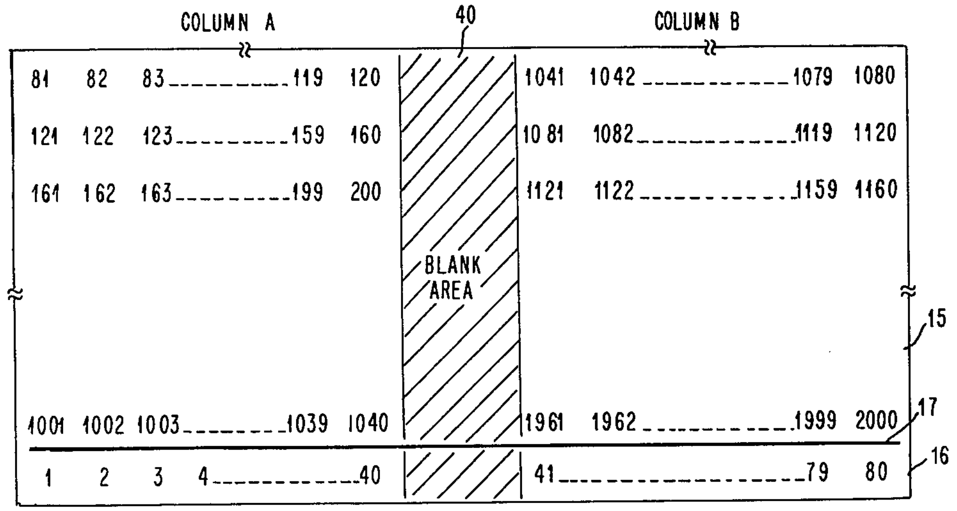
FIG. 4 shows the split screen character layout and translated addresses produced by the logic of FIG. 3.

FIG. 4 shows the split screen character layout produced by the logic of FIG. 3 together with the address in buffer 1 of the corresponding characters. It should be noted that due to the blank area 40 which is two characters wide, the screen display width is 82 characters wide. The analog video circuits are self compensating and so the position of the center of the display remains unchanged while the width increases. Also lower status indicators 16 remain unchanged in position apart from the shift due to the center blank.

Considering firstly left-hand column A, the upper row displays characters having addresses 81 to 120 and the next row characters having addresses 121 to 160. This continues in the same manner up to the last row with characters having addresses 1001 to 1040. Similarly in right-hand column B the first line has characters with addresses 1041 to 1080 and the last line characters with addresses 1961 to 2000.

Thus the display system of FIG. 3 can either operate with a normal screen layout as shown in FIG. 2 or be switched to split screen layout as shown in FIG. 4 when ROS 20 supplies the translated addresses as previously described. Split screen displays have their main application in the Publishing Industry where an operator may compare two versions of an article displayed side by side.

The refresh logic described in FIGS. 1 and 3 assumed that characters are displayed as a matrix of dots. Alternatively, characters displayed may be by stroke drawn character generation.

The system of FIG. 3 enables a single alternative layout. If several alternative screen layouts are required, additional read only storage could be provided, divided into sections, each section corresponding to a full screen of translated addresses. Then selection of a particular ROS section would give the screen layout stored by that portion.

Figure 6:
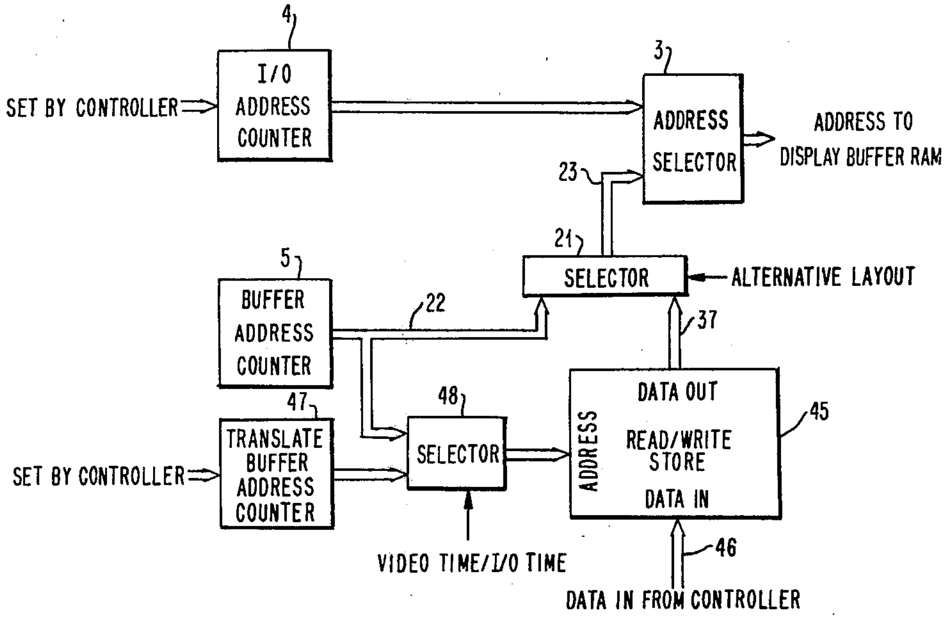
FIG. 6 illustrates the use of a read/write store in the system of FIG. 3.

However, it may be preferable to use a read/write translate store 45 when several alternative screen layouts are required as shown in FIG. 6. This figure replaces a portion of FIG. 3 relating to address translation and essentially performs the same operations. Logic blocks numbered as in FIG. 3 will not be described in detail again. Read/write translation store 45 is loaded with a sequence of translated addresses from the display controller on bus 46. Each alternative screen layout requires its own sequence of translated addresses for read/write store 45.

When address sequences are loaded during I/O time into read/write store 45, translate buffer address counter 47 supplies the storage addresses for that data via selector 48. During video time, buffer address counter 5 supplies addresses to read/write store 45 via selector 48 to read out a sequence of translated addresses as previously described with reference to FIG. 3.

Figure 7:
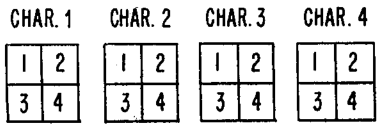
FIG. 7 illustrates the character blocks of the Hanguel language.
Figure 8:
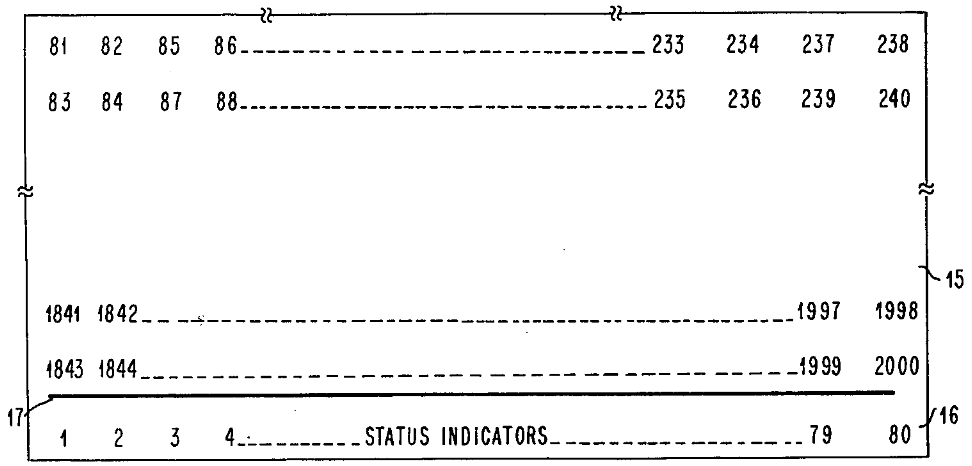
FIG. 8 shows a screen layout and translated addresses for the Hanguel language.

A specialized application of the present invention is to display ideographic characters, such as the Hanguel characters for the Korean national language. This language writes its characters in blocks of four component characters as shown in FIG. 7. FIG. 8 shows a screen layout for Hanguel characters arranged in groups of four e.g. 81, 82, 83 and 84 represents Hanguel character 1 in FIG. 6. The address translation used is as illustrated in FIG. 8.

The group of four characters 81, 82, 83 and 84 are keyed in that order, and are stored via the controller in order of keying in refresh buffer 2. Address translation, according to the rules of the language, displays these characters in Hanguel configuration. As attributes apply along rows, in Hanguel layout, it is necessary to allocate a whole Hanguel character for attribute use, and key in an attribute for each character row. For example, in FIG. 8, if BRIGHT UP were required, this attribute byte would be entered as characters 81 and 83 (or 82 and 84) and this would display the whole screen in BRIGHT UP mode. If the last Hanguel row was to be NORMAL, this attribute byte would be entered in 1841 and 1843 (or 1842 and 1844). Note that as a full screen of characters is used, attribute decode logic B 26 in FIG. 3 is not required here.

The invention also has application whenever a complicated screen layout is required. For example, characters may be displayed in a fixed number of columns or in a number of restricted areas. An extreme example of address translation would be to arrange that characters were displayed sequentially from top to bottom of each line as in the Japanese language. Attributes as previously described are not suitable for this columnal layout.

Figure 9:
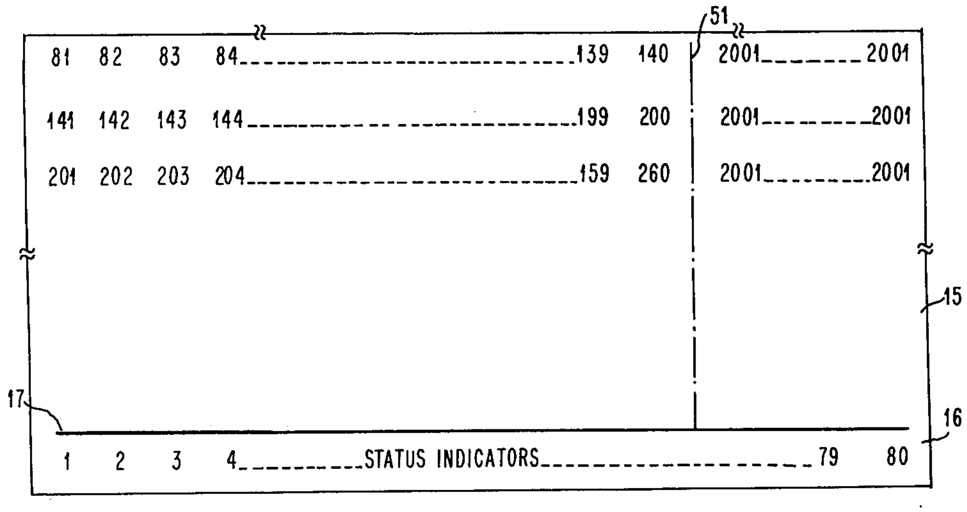
FIG. 9 illustrates selectable line length screen layout and translated addresses.

Another example is variable line length in which the read/write store 45 is loaded with translated addresses for only a portion of line widths as shown in FIG. 9. In this diagram a line length of sixty characters is shown e.g. the top line has valid character address 81 to 140 in which the associated data is held in the buffer store. Reference numeral 51 indicates a vertical broken line representing the end of the usable line. After line 51 all translated addresses are identified as invalid address 2001. This is a location in refresh buffer 1 which cannot be used for character storage and thus character display in the right-hand portion of the screen is inhibited.

We claim:

1. A display system comprising a scanned refresh display device, a refresh buffer having storage positions for data to be displayed and address generating means arranged to address the refresh buffer in a first sequence of addresses to display the data in a first screen layout, characterized by a translation store addressable by said first sequence of addresses to read out a modified address for each address of said first sequence to provide a sequence of translated addresses arranged to address the refresh buffer to display the data in a second screen layout, and selection means operable in a first mode to switch said first sequence of addresses to the refresh buffer and operable in a second mode to switch said modified sequence of translated addresses to the refresh buffer.

2. A system as claimed in claim 1, in which said translation store is a read only store personalized with a sequence of translated addresses.

3. A system as claimed in claim 1, in which said translation store is a read/write store into which a sequence of translated addresses may be written from a controller.

4. A system as claimed in any one of the preceding claims, in which said address generating means is sequentially incremented during said first mode of operation to produce said first sequence of addresses in response to regularly occurring clock pulses supplied thereto, and means operable during said second mode of operation to suppress selected of said regularly occurring clock pulses in order to generate blank regions between adjacent groups of data displayed in said second screen layout, the size and position of the blank region being determined by the number and position of clock pulses suppressed.

5. A system as claimed in claim 4, in which said means operable during said second mode of operation is controlled, and said sequence of translated addresses is arranged, so as to produce a split screen display format in which the data is displayed in two individually coherent blocks separated by a vertical blank column.

6. A system as claimed in claim 5, in which said refresh buffer additionally stores attribute bytes each associated with one or more data bytes, said attribute bytes functioning to determine the manner in which the associated data bytes are to be displayed, said system including first attribute decode logic operable during said first mode to detect and decode said attribute bytes and to supply appropriate control signals to said display device for the subsequent display of associated data characters, and second attribute decode logic operable with said first decode logic during said second mode to detect and decode attribute bytes and to respectively supply appropriate control signals to said display device for the subsequent display of associated data, in the two separate blocks of data in said split screen format.

7. A system as claimed in claim 1, 2 or 3, in which said translation store provides address translation for serially supplied component characters representing ideographic characters so that the component characters are rearranged for display according to the rules of the language.

8. A system as claimed in claim 7, in which each ideographic character is represented by a serial stream of four component characters and the address translation is such that the four component characters are displayed as a 2×2 matrix.

9. A display system as claimed in claim 1, 2 or 3, in which said modified sequence of translated addresses includes invalid addresses not associated with data in said refresh buffer, said invalid addresses being supplied together with valid addresses by said translation store in such a way that the resultant displayed data obtained from valid addresses in said buffer is confined to a limited portion of the available display area.

* * * * *